United States Patent Office 3,129,773
Patented Apr. 21, 1964

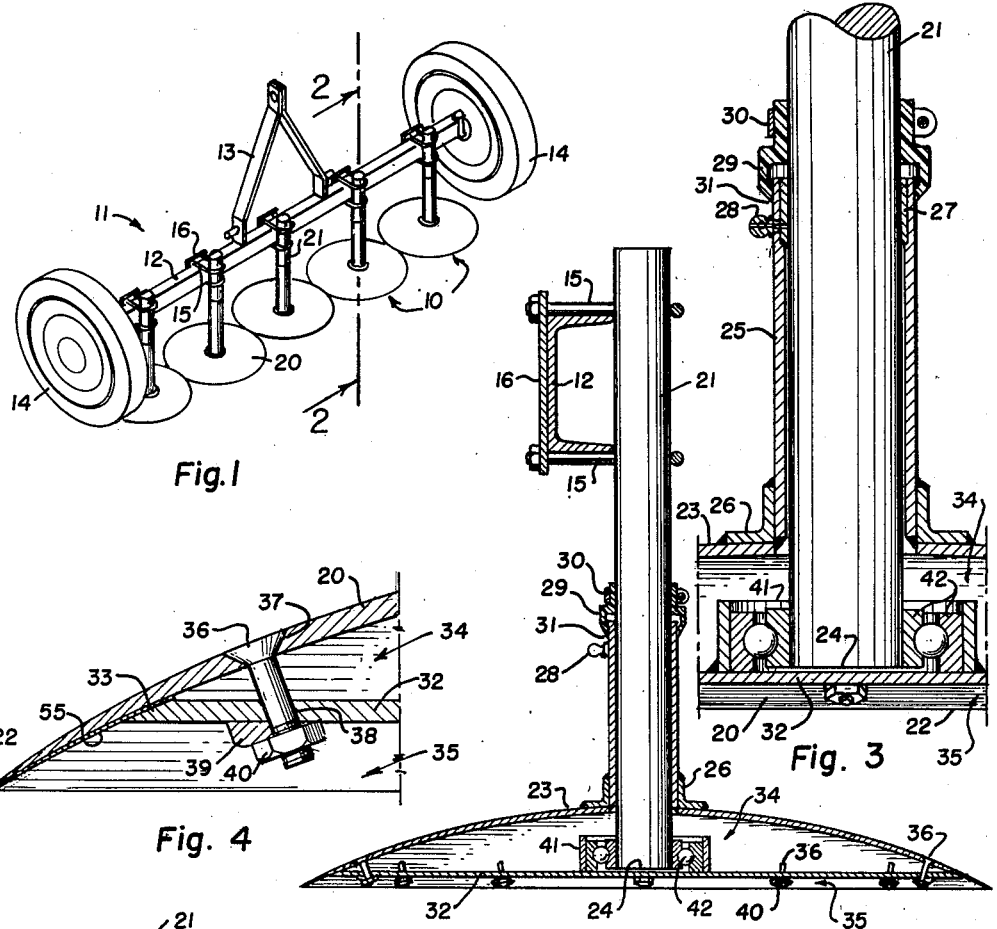
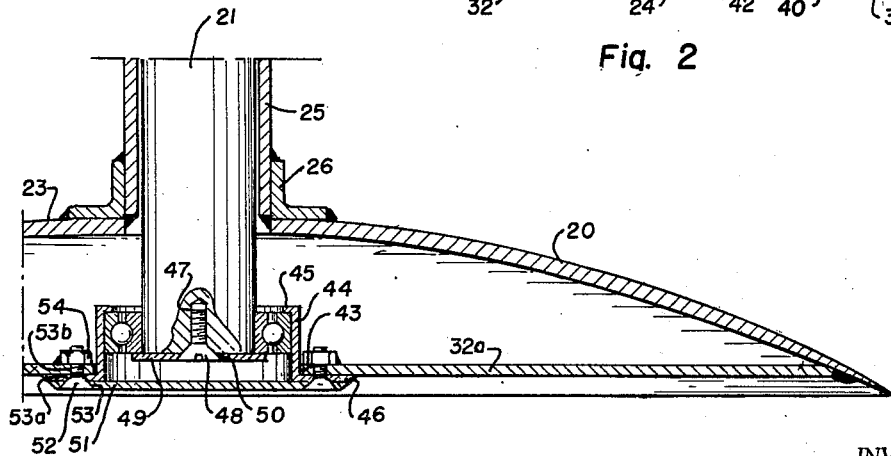
Fig. 1, Fig. 2, Fig. 3, Fig. 4, Fig. 5
INVENTOR.
Louis O. Freeman
BY
ATTORNEY

3,129,773
MOUNTING MEANS FOR A HORIZONTAL
DISC CULTIVATOR
Louis O. Freeman, Rte. 1, Eads, Colo.
Filed July 15, 1963, Ser. No. 295,010
9 Claims. (Cl. 172—522)

This invention relates to weed cutters and cultivators of the type which use a horizontally disposed disc as the cutter and cultivator. As such, the invention will be called a "horizontal disc cultivator," and a primary object of the invention is to provide a novel and improved structural arrangement of the components forming a horizontal disc cultivator which permit an enhanced operation of the disc as it is being pulled through the soil to cut weeds and to otherwise cultivate the soil.

Horizontal disc cultivators have been heretofore used and they generally employ a dished disc, similar to a common harrow disc, but with the disc being held in a horizontal or substantially horizontal plane. The horizontal discs are preferably mounted upon a pivoted shaft so that they may rotate back and forth as they are being pulled through the earth for this rotative action enhances the cutting action of the edge of the disc by constantly changing the leading edge of the disc and by producing a slicing action as well as a pushing action of the disc edge against weeds which it may encounter.

Such discs may be mounted upon a cultivator frame in any suitable manner, such as in transverse rows or in an echelon pattern. It is contemplated that the cultivator frame will permit the disc to be lowered into the ground an inch or so to break up any crust forming on the ground surface and at the same time cut away weed growth. Each disc is mounted upon a vertical shaft or post and in preferred construction, either the disc is adapted to rotate about the shaft or the shaft is affixed to the disc and is adapted to rotate in supporting bearings on the cultivator frame above.

The primary problems concerned with use of horizontal disc cultivators resides in the fact that as the earth is cultivated, the discs necessarily throw small particles about and create dust if the earth is at all dry. This, in turn, causes trouble in the bearings and between other moving parts, creating excessive friction and undue wear on any bearings or moving surfaces which are not completely protected from the dust action.

Also, there exists a problem of holding the disc and its supporting shaft in place whenever the disc strikes a hard unyielding object such as a rock or patch of hard earth. In using a dish-shaped disc, such as a conventional harrow disc for this purpose, the forces against the dish-shaped disc are effectively against the outer face of the dish in a manner substantially opposite to that which occurs when a harrow disc is used for earth-turning operations for which it was designed and intended to be used. This change in direction of pressure on the disc when held horizontally creates a bending action sufficient to cause the disc to flex and buckle the leading edge downwardly in a manner which causes it to dig into the earth to further increase the pressure against it. In the extreme the disc will buckle on the supporting shaft and even create excess bending in the shaft itself. Because of the above problems, cultivators of the horizontal disc type have never been widely used. It was found that units having suitable dust sealed bearings and special extra heavy disc constructions were too expensive to be feasible.

The present invention was conceived and developed with such problems in view and it comprises, in essence, a horizontal disc cultivator made from a standard harrow disc reinforced and mounted upon a fixed shaft in a manner which substantially eliminates the possibility of dust or abrasive particles from finding their way to the moving bearing surfaces between the disc and shaft, and which is adapted to effectively resist lateral thrust by including a construction which translates a force effect directly from the edge of the disc to the supporting shaft, in a manner which eliminates any distorting or buckling of the disc.

It follows that another object of the invention is to provide a novel and improved horizontal disc cultivator wherein all surfaces and moving parts are effectively enclosed and the disc is thereby adapted to rotate freely upon a shaft without the danger of dust and dirt getting into the moving parts thereof.

Another object of the invention is to provide a novel and improved horizontal rotary disc cultivator having an enhanced arrangement of structural components which permits the effect of cutting forces at the disc periphery to be translated directly to the supporting shaft without creating a bending action on the disc.

Another object of the invention is to provide a novel and improved rotary disc cultivator which permits conventional low-cost harrow discs to be used, with only simple modifications thereto.

Another object of the invention is to provide a novel and improved horizontal disc cultivator which advantageously incorporates an extra heavy vertical shaft within its assembly, which extends downwardly through the cultivator disc and substantially to its base to thereby effectively resist lateral thrust action as the cultivator is being used.

Another object of the invention is to provide a novel and improved rotary cultivator which may be easily attached to any standard cultivator frame or cultivating equipment with a minimum of alterations to such frame or equipment.

Further objects of the invention are to provide in an improved rotary cultivator a construction which is simple, neat-appearing, economical, rugged and durable.

With the foregoing and other objects in view, all of which more fully hereinafter appear, my invention comprises certain constructions, combinations and arrangements of parts and elements as hereinafter described, defined in the appended claims and illustrated in the accompanying drawing in which:

FIGURE 1 is an isometric view of a simple type of cultivator carrier frame having a row of horizontal disc cultivators mounted thereon, the cultivator frame being exemplary of an arrangement in which my improved horizontal disc cultivators may be used.

FIGURE 2 is a sectional elevation of a single horizontal disc cultivator unit as taken substantially from the indicated line 2—2 at FIG. 1 but on a greatly enlarged scale.

FIGURE 3 is a fragmentary sectional portion of the showing at FIG. 2 but on a further enlarged scale.

FIGURE 4 is another fragmentary sectional portion of the showing at FIG. 2 but on a further enlarged scale.

FIGURE 5 is a fragmentary sectional portion of a horizontal disc cultivator similar to the showing at FIG. 2 but on an enlarged scale and illustrating a modified arrangement thereof.

Referring more particularly to the drawing, my improved horizontal disc cultivator 10 is adapted to be mounted upon any cultivator carrier frame 11 such as the unit illustrated at FIG. 1. This cultivator frame 11 is illustrated as having a single rigid, transverse body bar 12 formed of a structural channel or the like. This body 12 includes an upstanding A-frame 13 which is adapted to be attached to a conventional three-point tractor hitch. The transverse body bar 12 also preferably includes a wheel 14 at each end to control the depth to which the cultivator 10 will cut into the earth when in use. It is to be understood that other types of cultivator carrier frames may also be used and that the unit 11 illustrated at FIG. 1 merely exemplifies the manner in which the improved horizontal disc cultivator units 10 may be used.

Each horizontal disc cultivator 10 includes generally, a disc 20 and a shaft 21 upstanding from the disc. A plurality of horizontal disc cultivators 10 may be mounted on the body bar 12 of this frame 11. This mounting is effected as by affixing the top of the shafts 21 to the bar 12 as with U-bolts 15 at the top and bottom of the bar 12 to embrace the shaft 21 and to extend over and under the bar 12 and into a clamping plate 16 at the opposite side of the bar. It follows that each shaft 21 is tightly secured to the frame bar 12 with its disc 20 being in a horizontal position a selected distance below the frame and at a distance which will permit the disc to properly cultivate the earth as the unit is operated. Also, to effect proper cultivation, each disc is pivotally mounted to the base of its shaft 21 as will be hereinafter described.

It is contemplated that each disc 20 will be a common harrow disc modified slightly to function in the arrangement described, for harrow discs can be obtained in quantity at low cost. A conventional harrow disc is in the general form of a flat dish oriented in an overturned position so that the peripheral edge 22, the cutting edge of the disc, defines a horizontal plane at the very bottom of the assembly. The center thereabove forms a crown 23, and the disc rotates about a central or polar vertical axis at this crown point which is also the axis of the shaft 21.

The rigidly held shaft 21 is designed and proportioned to be a rugged member with its diameter being sufficient to provide adequate strength to resist the pressure and strains and primarily the lateral forces on the cultivator which will occur during ordinary use of the cultivator. The lower portion of this shaft extends downwardly and through an orifice in the crown 23 of the disc with the bottom 24 of the shaft being at a level slightly above the bottom of the assembly.

A tubular sleeve 25 is affixed to the top of the disc 20 to upstand from the crown thereof and to telescopically fit over the shaft 21 to rotate thereon. This sleeve may be fastened to the disc as by welding and may include a reinforcing angle ring 26 about its base to enhance the strength of the connection. The sleeve provides for an upper bearing surface on the shaft 21, and it may be formed to fit snugly thereover or its internal diameter may be larger than the shaft diameter to provide a loose fit thereon and it will then include a snugly fitting antifriction bearing 27 at its top section as in the manner clearly illustrated at FIG. 3. A grease gun fitting 28 may be provided at this sleeve to facilitate lubricating the unit.

The upper end of the sleeve 25 is closed by a dust seal ring 29 which is affixed to the shaft 21 immediately above the top of sleeve 25 as by a collar 30. This seal forms an inverted cup-shaped segment which overlaps the top edge of the sleeve with the lower edge 31 of the cup being contracted in diameter to provide a tight, resilient fit upon the sleeve. This type of dust seal is especially desirable since it will effectively hold out grit particles and the like, for such will tend to fall away from the seal. Likewise, it may be effectively cleaned by pumping an excess of grease within the unit as through the fitting 28 with excess grease and any dirt or dust accumulation being ejected from the contacting lower edge 31 of the grease seal.

The underside cavity of the disc 20 is enclosed by a flat disc-shaped floor plate 32 whose diameter is somewhat less than the diameter of the disc 20 so that it will abut against the disc a short distance above the peripheral edges thereof. This floor plate 32 has its edges suitably beveled as at 33 so that it may be snugly fitted to the under surface of the disc 30 and thus provide a fully enclosed interior cavity 34 within the disc. A narrow spacing or gap 35 is also formed between the bottom of the floor plate and the plane of the peripheral edge of the disc 30. The floor plate 32 may be attached to the disc 30 in any suitable manner and in the construction illustrated at FIGS. 2, 3, and 4, this connection is by a ring of bolts 36 adjacent to the periphery of the disc and of the floor bolts. These bolts 36 are preferably of the flat head type passing through orifices 37 in the disc which are cone-reamed to fit the flat heads of the bolts and provide for a smooth flush surface. Thence, the bolts pass through orifices 38 in the cover plate to secure the members together. Because of the angularity of the members at the connections, the bolts and orifices 38 are inclined with respect to the floor plate, and angle washers 39 must be used with bolt nuts 40. The orifices 37 and 38 through which the bolts 36 pass and the contacting bevel 33 of the peripheral edge of floor plate 32 may be sealed and made dust-tight as by an epoxy-type resin or like sealing material which will set up to form a hard tenacious substance, such rendering the chamber 34 completely dust proof.

The shaft 21 extends downwardly into the chamber to a position where its bottom 24 is closely adjacent to the floor plate 32. A carefully centered cup ring 41 upstands from the floor plate 32 and contains a ball bearing race 42 which fits within the cup ring 41 with a tight, press fit. The inner diameter of the race 42 is such as to also receive the bottom of the shaft 21 with a tight, press fit. The use of a press fit of the bearing race within the cup and of the shaft within the bearing race no tighter than that commonly used in fitting bearings is adequate to hold the assembly together.

It is contemplated that the assembled unit will be filled with sufficient grease as from the fitting 28 not only to lubricate the bearing 27, but also to lubricate the race 42. In operation there will be no possible access of dust to bearings and the disc may rotate freely upon its shaft 21 as it is being pulled through the earth. Whenever necessary, an additional greasing, using an excess of grease, will cause grease to flow from the bottom edge of the dust seal ring 29 and eject any dust or material which could have possibly lodged itself between the dust seal ring and the sleeve 25.

The alternate construction illustrated at FIG. 5 provides an assembly where it is not desirable to fit the bearing race with a tight press fit. The floor plate 32a is provided with a central circular opening 43 wherethrough a rimmed ring 44 is passed, the ring being sized to contain the race 42 with a snug sliding fit. It includes an inwardly turned flange 45 at its upper edge to hold the bearing race 42 in place. It also includes an outwardly directed flange 46 which is adapted to lie against the underside of the floor plate 32a about the opening 43 to be bolted thereto as will be described.

The bottom 24 of the shaft 21 is tapped at its axial center as at 47 to receive a machine screw 48. A bearing retainer disc 49 having a diameter slightly larger than that of the shaft is affixed to the bottom of this shaft by the machine screw 48 extending through a centered orifice 50 in the disc and into the tapped hole 47, as clearly illustrated at FIG. 5.

The bottom of this assembly is then closed by a cap disc 51 having its outside edge flush with the outer flange 46 of the connector ring. This connection of the capping disc and of the flange to the floor plate is effected by a circle of flat head machine screws 52 which extend through orifices 53 in the cap disc, registering orifices 53a through the flange 46 and orifices 53b through the floor plate 32a. These machine screws 50 are held by nuts 54 welded onto the top surface of the floor plate 32a. Suitable sealing material or gaskets are interposed between the plates and flanges to provide for a dust proof connection.

It is desirable to keep the cutting edge at the periphery of the disc-shaped cultivator as sharp as possible and a hard facing material is applied to one surface of the disc 20 to facilitate a natural sharpening action. It is preferred that this hard facing be applied to the inner side of the disc as at 55 in the manner illustrated at FIG. 4 so that the edge of the disc will constantly wear sharp.

I have now described my invention in considerable detail, however, it is obvious that others skilled in the art can devise and build alternate and equivalent constructions which are within the spirit and scope of my invention. Hence, I desire that my protection be limited, not by the constructions illustrated and described, but only by the proper scope of the appended claims.

I claim:

1. In combination with the cultivator frame and a shaft depending therefrom, a horizontal disc-type cultivator member affixed to the base of the shaft and comprising:
   (a) an inverted dished disc having its peripheral edge defining a horizontally disposed cultivating base edge at the bottom of the member and having an axially centered passageway through the crown of the disc, thereabove, through which the lower portion of said shaft extends;
   (b) a substantially flat floor plate adjacent to the peripheral base edge of the disc affixed to and enclosing the underside of the dished disc and thereby forming an enclosed cavity therein, and;
   (c) a bearing-holding means affixed to the center of said floor plate and the bottom of said shaft whereby to retain the cultivator member on the shaft and to permit it to rotate about the shaft, and to withstand lateral thrust imposed against the edge of the disc.

2. In the organization set forth in claim 1, a sleeve upstanding from the crown of the dished disc, said shaft extending therethrough and a bearing means in the sleeve adapted to engage with the wall of said shaft above the dished disc.

3. The organization set forth in claim 2, including a dust-seal means on the shaft adjacent to the top of the sleeve and being adapted to overlie the end of the sleeve to prevent dust and like particles from coming between the moving portions of the sleeve and shaft.

4. In the organization set forth in claim 1, wherein said bearing-holding means comprises a cup-like member upstanding from the floor plate and a ball bearing race within the cup, said cup being proportioned to receive the bearing race with a press fit and inner opening of the bearing race being adapted to receive the bottom end of the shaft with a press fit.

5. In the organization set forth in claim 1, wherein the bearing-holding means comprises an axially centered opening in the floor plate, a flanged ring adapted to be passed through said opening, having an internal flange at its top edge and an external flange at its bottom edge, with the external flange being adapted to abut against the underside of the floor plate, a bearing race adapted to fit within the ring and to abut against the top internal flange thereof, the internal diameter of the bearing race being adapted to receive the bottom of the shaft, and a retainer plate adapted to be affixed to the bottom of the shaft adapted and to abut against the bottom of the bearing.

6. In the organization set forth in claim 5, a cover adapted to completely enclose the bottom opening of the ring at the underside of the floor plate.

7. In combination with a shaft depending from a cultivator, a horizontally disposed disc-type member rotatably carried at the base of the shaft and comprising:
   (a) an inverted dished disc having its peripheral edge defining the horizontally disposed cultivating base edge at the bottom of the member and having an axially centered passageway through the dished crown thereabove;
   (b) an axially centered sleeve member upstanding from the dished crown and being adapted to be telescopically and rotatably mounted upon the shaft with the lower end of the shaft being adapted to extend through the passageway in the dished disc;
   (c) a substantially flat floor plate adjacent to the peripheral base edge of the disc affixed to and enclosing the under side of the dished disc thereof, to form an enclosed cavity within the dished disc, and;
   (d) a bearing and holding means affixed to the center of the floor plate within the cavity adapted to hold the bottom end of the shaft and thereby retain the disc member on the shaft and permit it to rotate about the shaft and to withstand lateral thrust imposed against the edges of the disc.

8. In the organization set forth in claim 7, wherein the sleeve includes a bearing surface adapted to rotatably hold the upper portion of the member in an axially centered alignment upon the shaft.

9. In the organization set forth in claim 8, including a dust-seal ring means between the top of the sleeve and the shaft.

References Cited in the file of this patent

UNITED STATES PATENTS

| | | |
|---|---|---|
| 465,497 | Randall | Dec. 22, 1891 |
| 1,298,046 | Huff | Mar. 25, 1919 |